United States Patent [19]
Berman

[11] Patent Number: 5,298,966
[45] Date of Patent: Mar. 29, 1994

[54] MEASUREMENT SYSTEM

[75] Inventor: Michael Berman, Austin, Tex.

[73] Assignee: Advanced Micro Devices, Inc., Sunnyvale, Calif.

[21] Appl. No.: 974,135

[22] Filed: Nov. 10, 1992

[51] Int. Cl.$^5$ .................. G01B 11/26; G01C 1/00; B05D 1/00

[52] U.S. Cl. .................. 356/154; 356/138; 427/10; 427/596

[58] Field of Search .......... 356/141, 152, 138, 154; 427/9, 10, 596, 240

[56] References Cited

U.S. PATENT DOCUMENTS

| | | |
|---|---|---|
| 3,752,588 | 8/1973 | Chapman . |
| 3,995,073 | 11/1976 | Kuonen et al. ............. 427/10 |
| 4,639,140 | 1/1987 | Lerat ............. 356/4 |
| 4,732,486 | 3/1988 | Rinn . |
| 4,749,273 | 6/1988 | Reinhold . |
| 4,850,695 | 7/1989 | Mikuriya et al. ............. 356/237 |
| 4,970,383 | 11/1990 | Caudle et al. . |
| 4,980,882 | 12/1990 | Baer et al. ............. 369/275.3 |
| 4,995,726 | 2/1991 | Fujita et al. . |

Primary Examiner—Stephen C. Buczinski
Attorney, Agent, or Firm—Johnson & Gibbs

[57] ABSTRACT

A contact-free, optical measurement system for determining the precision with which an article rotates. A reflective surface is secured to a rotating surface and a light source, such as a laser, is disposed thereabove. A target is likewise secured in association with the light source to receive the reflected light from the spinning surface. In this manner, any dynamic angular misalignment, or wobble, in the spinning surface will be manifested in movement of the reflected light upon the target. The degree of wobble of the spinning surface may then be readily ascertained.

15 Claims, 1 Drawing Sheet

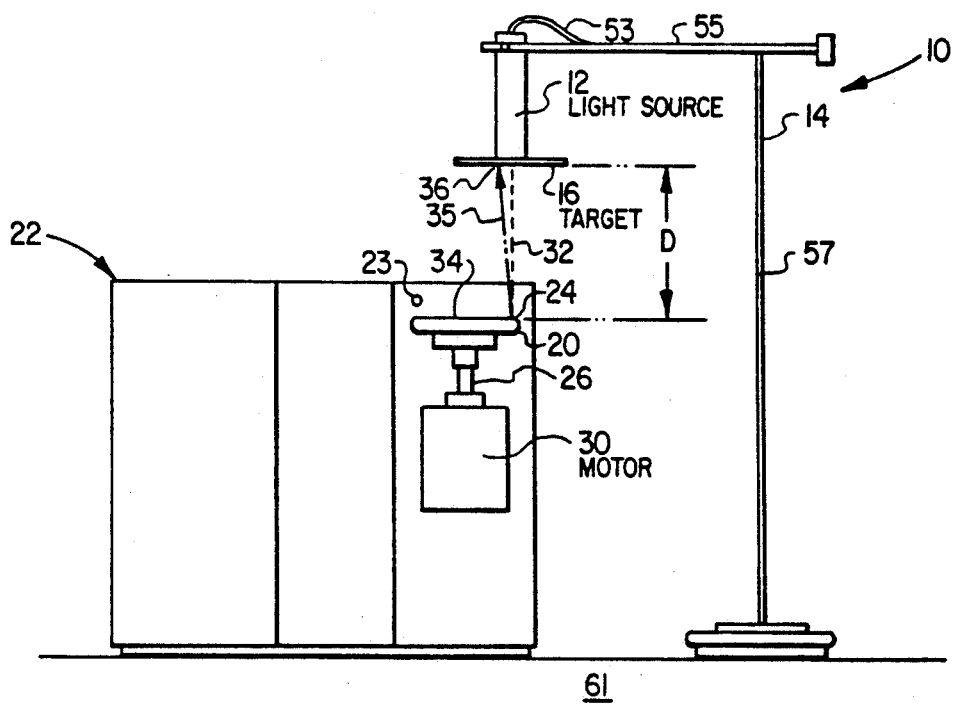
FIG. 1
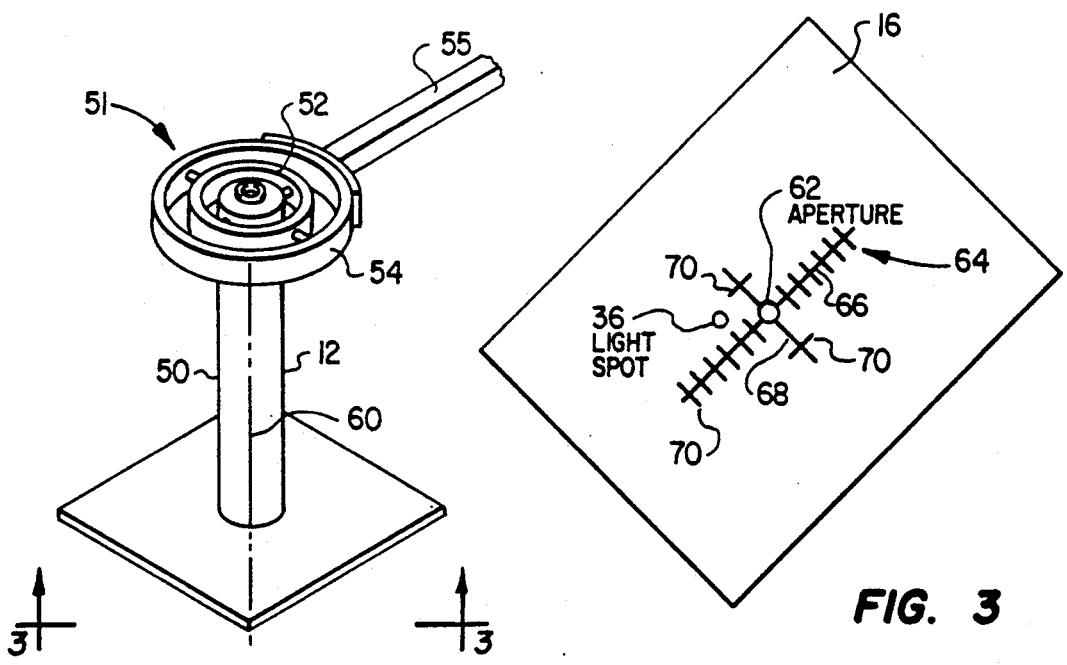
FIG. 2
FIG. 3

MEASUREMENT SYSTEM

BACKGROUND OF THE INVENTION

1. Field of the Invention

The present invention relates to measurement devices and, more particularly, to a contact-free, optical measurement systems for determining the precision with which a surface spins about an axis. In a preferred embodiment, the spinning surface is associated with, and related to, the manufacture of integrated circuit chips.

2. History of the Prior Art

The use of spinning surfaces such as mandrels, spindles and the like dates back into technological antiquity. Early craftsman, for example, formed clay pots by using a spinning base upon which the clay to be molded was positioned. The technique is used even today. The spinning of the base permits not only uniform application of molding forces around the object being formed but also the incorporation of certain centrifugal forces thereto. It is the latter aspect of spinning mandrels that has found a niche in high tech fabrication techniques, including the sophisticated, and technically challenging, semi-conductor manufacture.

In the manufacture of semi-conductor devices, such as integrated circuits, a plurality of devices are formed on a single wafer of silicon material. Each wafer is typically circular and on the order of 6 inches in diameter. The wafers are put through a number of sequential processing steps, including washing, spinning and coating them with photo-resists, exposing them to the optical patterns formed on photo masks, exposing them to both liquid and gaseous treating environments, and passing them through high temperature baking operations.

The processing of a silicon wafer containing a plurality of semi-conductor devices requires a high degree of cleanliness and precision in the environment in order to produce acceptable devices. The ability of a semi conductor device to perform satisfactorily from both electrical and mechanical standpoints depends upon the nature and quality of the materials forming the various layers of the device and the precision of various manufacturing steps. Errors in processing and/or the introduction of any foreign matter into the environment where the wafers are being handled results in a decrease in the "yield" of the wafer. The yield is the number of devices that can pass the required electrical tests of the device after the processing has been completed. This is usually expressed as a fraction of the total number of devices processed on the wafer that did pass the required tests Thus, the higher the precision of the processing steps used in manufacturing the semi-conductor devices, the greater the yield and hence the greater the financial return to the manufacturer.

The semi-conductor wafers are generally handled between processing steps in inert plastic frames containing a plurality of vertically arranged dividers. Each divider defines a pocket to receive a silicon wafer and holds it securely in a vertical orientation while isolating it from adjacent wafers. The plastic frame and its dividers are together referred to as a wafer "cassette." A typical industrial cassette may hold on the order of 25 wafers for processing. The cassettes are physically moved by operators from one processing station to another wherein the cassettes are placed in indexing mechanisms that generally form a part of the processing machinery of each station. Each wafer is then automatically removed from the cassette for processing and returned by the indexing mechanism after the processing step of each station has been completed.

One step of the fabrication technique requires that the wafer be removed from the cassette and mounted onto a mandrel for rotation through a wide range of RPM's. These units are commonly referred to as "spinners." The rotation of the spinner generates centrifugal forces utilized to remove and/or control the thickness of various liquids deposited on the wafer surface. If the deposited liquid is a photo-resist, the spinner is generally part of a coating line If the deposited liquid is a developer, the spinner is part of a development track In the application of such liquids, the wafer may be spun at high RPMs in order to drive off the liquid by centrifugal force. In certain steps, however, more viscous fluids, such as photo-resist are deposited thereon. The wafer is rotated at a different speed for establishing a uniform spread and a controlled thickness of the fluid coating. For proper results, it is imperative that the precision of rotational spin and axle alignment be carefully maintained and monitored.

It is well known to measure rotational tolerance of spindles and the like with feeler gauges and other sensors that contact the spinning surface. The reliability and response time of such mechanical devices is not, however, always sufficient for the high degree of precision and/or speed necessary in semi-conductor fabrication. This is particularly true when the fabrication technique utilizes a high speed spinner, because the response time of a feeler gauge is oftentimes greater than the rate of rotation. Accurate measurement would not then be possible. For this reason, more precise measurement devices are needed in the semiconductor fabrication industry.

The design of precise measurement systems for a variety of industrial applications is well established. Many of these systems use optical arrays which may include lasers as the light source. One such system is shown in U.S. Pat. No. 4,995,726 which utilizes an optical array to detect the surface profile utilizing optical heterodyne interference. Yet another optical linear measurement device is seen in U.S. Pat. No. 4732486, wherein a semi-reflecting mirror reflects the light of a first laser beam path to a path diverting mirror to generate a second beam path the course of which is parallel to the first beam path. An object to be measured is positioned at right angles in relation to and within the two beam paths. Light sensors receive darkened light signals in the respective beam paths behind the object to be measured. By means of electronic evaluation, the inclination of the object to be measured can be determined and the exact diameter of the object can be calculated without being influenced by its inclination.

Sophisticated measurement systems, such as those described above, utilize not only lasers for emitting the light, but sophisticated electronic evaluation units in conjunction with control systems for rotating the mirrors being used therewith. While effective for high precision, contact free optical measurement, such systems do not afford a basic, inexpensive device for measuring the precision with which an object rotates. Indeed, the very genesis of the above-described laser mounted systems do not find their application in such areas. There thus remains a need in the semi-conductor manufacturing industry, and in quality control operations for spindles in general, for the determination of precision with which a spindle rotates, both with and without loads and through a wide range of RPM's.

The present invention provides such a measurement system by utilizing a light source, preferably provided by a laser, which light source is projected relative to a target surface in a position facilitating a visual inspection of rotational precision. The inspection, or measurement, may be performed by an operator without the aid of expensive and complex systems to determine the precision by which a reflective surface rotates there beneath.

SUMMARY OF THE INVENTION

The present invention relates to a contact-free, optical measurement device comprising a light source that emits a beam of light in conjunction with a target surface for displaying the reflected light thereon. More particularly, the present invention comprises apparatus for the measurement of angular deflection of a spinning surface comprising a light source for generating a beam of, light toward the surface to be measured and means for displaying the reflection therefrom. The apparatus includes means for supporting the light source and Permitting it to assume a select orientation which may, in one embodiment, be parallel to the pull of gravity Reflective matter is mounted upon the spinning surface and a reflection target is secured relative to the light source for displaying light reflected from the surface. Means, associated with the target are provided for determining the deviation of the reflected light upon the target during the rotation of the spinning surface.

In another aspect, the above described invention includes the light source in the form of a laser. In one embodiment, the laser has a self-contained power source, such as a battery. In one embodiment the support means comprises a gimbal mounting fixture adapted for securing the light source therein and permitting the light source to depend therefrom and assume an angular orientation parallel with the pull of gravity.

In another aspect, the above described invention is adapted for use with a semi-conductor wafer manufacturing spinner. The reflective matter mounted upon the spinning surface comprises a semi-conductor wafer. The spinner may be disposed within a housing adapted for applying liquid to the wafer for the subsequent spinning thereof In yet another aspect, the above described invention includes the reflection target being a planar member secured to the light source. The target includes a hole formed therethrough adapted for being disposed over an end of the light source for receiving a beam of light from the light source therethrough. The means associated with the target for determining the deviation of the reflected light comprises indicia formed upon the target facilitating the visual measurement of any movement of the reflected light beam from the spinning surface.

In yet a further aspect, the invention includes a method for measuring angular deflection of a spinning surface. The method comprises the steps of providing a light source for generating a beam of light toward the surface to be measured for reflection therefrom and supporting the light source relative to the spinning surface. Reflective matter is mounted to the spinning surface, and a reflection target is then provided for receiving the reflection of light from the reflective matter. The reflection target is secured relative to the light source for displaying light reflected from the target and means are then provided for determining deviation of the reflected light upon the target during rotation of the spinning surface. As described above, the light source may comprise a laser.

BRIEF DESCRIPTION OF THE DRAWINGS

For a more complete understanding of the present invention and for further objects and advantages thereof, reference may now be had to the following description taken in conjunction with the accompanying drawings in which:

FIG. 1 is a diagrammatic illustration of one embodiment of the method and apparatus of the present invention;

FIG. 2 is an enlarged perspective view of one embodiment of a light source assembly of the type illustrated in FIG. 1; and FIG. 3 is an enlarged bottom plan view of the target plate of FIG. 2 taken along lines 3-3 thereof; and

DETAILED DESCRIPTION

Referring first to FIG. 1, there is shown a diagrammatic illustration of one embodiment of a method of and apparatus for measuring the precision of a rotating surface constructed in accordance with the principles of the present invention. The measurement system 10 comprises a light source 12 suspended from a support frame 14 in conjunction with a target surface 16 secured thereto. The system 10, as shown herein, is disposed above a spindle assembly 20 which forms a portion of semi-conductor wafer coating unit 22. The spindle 20 includes a top surface, or spinner 24 that is mounted to a shaft 26 that is driven by a motor 30. elements of the spindle assembly 20 are shown diagrammatically for purposes of illustration only. The spindle assembly 20, comprising a part of the coating unit 22, is a commercially available system. A liquid discharge orifice 23 is disposed adjacent the spindle assembly 20 for distribution of fluid across spinner 24. The system 10 of the present invention is provided for proper maintenance in, and quality control of, spinners 24 used for semi-conductor coating and developing processes and other manufacturing applications.

Still referring to FIG. 1, the light source 12 is disposed over the spinner 24 in position for projecting a beam of light 32 downwardly thereupon. A reflective surface 34 is placed upon the spinner 24, which reflective surface may comprise a semi-conductor wafer, although other reflective surfaces are contemplated for use with the present invention. Light beam 32 is thus reflected from the surface 34 to the target 16 a distance "D" as shown. By using a light source such as a laser, the originating beam and the reflected beam can be precisely defined in cross section thereby producing a method of determining any angular movement (wobble) of the reflective surface 34 during rotation. If the beam 32 from the light source 12 strikes the surface 34 in a perfectly orthogonal position relative thereto, the beam will be reflected back upon itself and will produce no image upon the target 16. Any deviation of the reflective surface 34 from bi-axial orthogonality (right angle incidence in both the x and y coordinate planes) will result in the beam reflecting upon a portion of the target plate 16 presenting an image indicative of the deviation. The reflecting beam is shown herein as dotted line 35 forming a spot of light 36.

Referring still to FIG. 1, the relationship between the movement of the spot of light 36 and the misalignment, or wobble, of the spinner 24 supporting the reflective surface 34 may be mathematically determined using conventional geometrical principles. Consistent therewith, the distance "D" between the target and the reflective surface 34 will directly effect the magnitude of movement of the reflected spot 36 upon the target 16 relative to a given degree of wobble of spinner 24. As "D" increases, so will the magnitude of movement of the spot of light 36 for a given misalignment.

Referring now to FIG. 2, there is shown one embodiment of a mounting configuration for the light source 12 diagrammatically illustrated in FIG. a. As shown in this particular embodiment, the light source 12 comprises a tubular housing 50 secured in a gimbal mounting assembly 51. The gimbal mounting 51 permits the light source 12 to incline freely A fixed mounting (not shown) of conventional design may also be used. The gimbal assembly 51 shown herein comprises a first gimbal ring 52 that is itself pivotally mounted within a second gimbal ring 54. The housing 50 is thus totally suspended from the gimbal mounting assembly 51 whereby gravity provides gravitational alignment of the light source 12 and the light beam 32 produced therefrom.

Referring back to FIG. 1 in combination with FIG. 2, the gimbal mounting assembly 51 is secured within a frame 55 that extends outwardly from a vertical support stand 57. It should be noted that any type of frame and/or support stand could be utilized in accordance with the principles of the present invention A tripod could have been shown for purposes of illustration in FIG. 1. Likewise, the gimbal mounting assembly 51 could be suspended from a ceiling joist or other structural member in the vicinity of the spinner 24.

Referring again to FIG. 2, the weight of the light source 12 within the gimbal mounting 51 causes it to assume the gravitational alignment configuration shown herein. An alignment-axis 60 is drawn downwardly in the direction of the spinner 24 (not shown in FIG. 2) for purposes of illustrating the alignment of the beam 32 in axial alignment with the gravitational force extending upwardly from the earth 61 through the spinner 24 and through the light source 12. For this reason, the light source 12 of this particular embodiment should hang freely. A power cord 53, such as that shown in FIG. 1, may interfere with the free suspension of the light source 12. In FIG. 2, the light source 12 thus has no cord and comprises a self contained unit which is battery operated.

The spinner 24 operates on the principle of centrifugal forces generated orthogonal to the force of gravity for uniformity of material dispersion, as discussed above. For this reason, any angular deviation of the spinner 24 from the horizontal (as determined relative to the force of gravity) may be of some degree of concern. This alignment may likewise be measured with the present invention. System 10 may thus be utilized in not only determining wobble in the spinner 24 during operation through various spin rates, but also in the initial mounting thereof. Functionally, a bubble leveling device will suffice in the initial set-up of such equipment. The most significant production problems in semi-conductor manufacturing occur through wobble of the spinner that results form baring wear and the like.

Referring now to FIG. 1 and FIG. 3 in combination, there is shown a bottom plan view of the target plate 16. A single central aperture 62 is formed in the target plate 16 of sufficient size to let beam 32 (FIG. 1) leave light source 12 and project therethrough. Indicia 64 is formed upon the surface of the target plate for purposes of indicating with precision the location of the reflected light spot 36 and angular misalignment or wobble reflected thereon. The indicia 64 may comprise orthogonal coordinates 66 and 68 having graduations 70 indicated thereon. Again, the actual value of angular misalignment can only be ascertained from the wobble of spinner 24 once the distance "D" between the target 16 and the spinner 24 has been defined.

In operation, the light source 12 of the present embodiment is allowed to depend from the gimbal mounting assembly 51 under the pull of gravity to assume an alignment coaxial with, or parallel to, said pull of gravity. The light source is preferably a laser and the alignment of the laser is thus perpendicular to the notional, or imaginary, plane passing through the horizontally disposed spinner 24. Because the spinner is generally used to evenly distribute fluid across the surface of an object such as a semi-conductor wafer mounted thereto, the precise horizontal alignment of said spinner is preferable. When the term "horizontal alignment" is used herein, however, it refers to an alignment that is generally perpendicular to the pull of gravity at a given point of measurement.

In one embodiment of the invention, a variation of the present invention may be utilized. For example, the precision with which a rotating surface moves (presence of "wobble") may be detected by a light source which is not disposed in a bi-axial, orthogonal relationship to the spinning surface. With such alignment, the light source may be selectively angulated and fixed relative to the spinning surface, which angulation will result in the deflected beam of light reflecting outwardly therefrom. In such a configuration, the target 16 would be disposed from the light source 12 in the appropriate position for receiving the reflected light beam. Any wobble in the rotating surface would likewise be reflected in movement of the reflected spot on the target 16. For this reason the target 16 may or may not be secured directly to the light source 12 in the practice of the present invention.

It is thus believed that the operation and construction of the present invention will be apparent from the foregoing description. While the method and apparatus shown and described have been characterized as being preferred, it will be obvious that various changes and modifications may be made therein without departing from the spirit and scope of the invention as defined in the following claims.

I claim:

1. Apparatus for the measurement of angular deflection of a spinning surface comprising:
   a light source for emitting a beam of light toward said surface to be measured for generating a reflection therefrom;
   means for supporting said light source, said support means comprising means for permitting said light source to assume a select orientation;
   reflective matter secured to said spinning surface;
   a reflection target secured relative to said light source for displaying light reflected from said surface;
   means associated with said target for determining the location and movement of said reflected light upon said target during the spin of said spinning surface as an indication of angular deflection thereof;
   said select orientation being generally parallel to the pull of gravity; and wherein said support means comprises a gimbal mounting fixture adapted for securing said light source therein and permitting said light source to depend therefrom and assume an angular orientation parallel with the pull gravity.

2. The apparatus as set forth in claim 1 wherein said light source comprises a laser.

3. The apparatus as set forth in claim 2 wherein said laser has a self-contained power source.

4. The apparatus as set forth in claim 1 wherein said spinning surface comprises a semi-conductor manufacturing system spinner and said reflective matter disposed upon said spinning surface comprises a semi-conductor wafer.

5. The apparatus as set forth in claim 4 wherein said spinner is disposed within a housing adapted for applying fluid to said wafer and the subsequent spinning thereof to evenly distribute said fluid across the surface of said wafer along a notional plane substantially perpendicular to the pull of gravity.

6. Apparatus for the measurement of angular deflection of a spinning surface comprising:
   a light source for emitting a beam of light toward said surface to be measured for generating a reflection therefrom;
   means for supporting said light source, said support means comprising means for permitting said light source to assume a select orientation;
   reflective matter secured to said spinning surface;
   a reflection target secured relative to said light source for displaying light reflected from said surface;
   means associated with said target for determining the location and movement of said reflected light upon said target during the spin of said spinning surface as an indication of angular deflection thereof;
   said reflection target comprising a planar member secured to said light source; and
   wherein said means associated with said target for determining the deviation of said reflected light comprises indicia formed upon said target facilitating the visual measurement of any movement of said reflected light beam thereupon.

7. The apparatus as set forth in claim 6 wherein said target includes an aperture formed therethrough adapted for securement over an end of said light source for receiving a beam of light from said light source therethrough.

8. A method for measuring angular deflection of a spinning surface comprising the steps of:
   providing a light source for generating a beam of light toward said surface to be measured for reflection therefrom;
   supporting said light source relative to said spinning surface with a select angular orientation relative thereto;
   disposing reflective matter upon said spinning surface;
   providing a reflection target for receiving the reflection of light from said reflective matter;
   securing said reflection target relative to said light source for displaying light reflected from said target;
   providing means associated with said target for determining a movement of said reflected light upon said target during the spin of said spinning surface; and
   wherein the step of supporting said light source with a select angular orientation includes the step of suspending said light source and allowing the pull of gravity to establish said select angular orientation.

9. The method as set forth in claim 8 wherein said step of providing a light source comprises the step of providing a laser to produce collimated light.

10. The method as set forth in claim 9 wherein said step of providing a laser includes the stop of providing said laser with a self-contained power source.

11. The method as set forth in claim 8 wherein said step of supporting said light source comprises the step of providing a gimbal mounting fixture adapted for securing said light source therein and permitting said light source to depend therefrom and assume an angular orientation parallel with the pull of gravity.

12. The method as set forth in claim 8 wherein said step of disposing reflective matter upon said spinning surface comprises the step of providing a semi-conductor wafer and mounting said wafer to said spinner.

13. The method as set forth in claim 12 and further including the step of disposing said spinner within a housing adapted for applying liquid to said wafer and the step of subsequent spinning said wafer to evenly distribute said liquid across the surface of said wafer.

14. A method for measuring angular deflection of a spinning surface comprising the steps of:
   providing a light source for generating a beam of light toward said surface to be measured for reflection therefrom;
   supporting said light source relative to said spinning surface with a select angular orientation relative thereto;
   disposing reflective matter upon said spinning surface;
   providing a reflection target for receiving the reflection of light from said reflective matter;
   securing said reflection target relative to said light source for displaying light reflected from said target;
   providing means associated with said target for determining a movement of said reflected light upon said target during the spin of said spinning surface;
   wherein said step of providing a refection target comprises the step of mounting a planar member to said light source; and
   wherein said step of providing a reflection target comprises the step of mounting a planar member to said light source; and
   wherein said step of providing means associated with said target for determining the deviation of said reflected light comprises the step of forming indicia upon said target to facilitate the visual measurement of any movement of the reflected light beam thereupon.

15. The method as set forth in claim 14 wherein said step of mounting said planar member includes the step of forming a hole there and securing said hole over an end of said light source for receiving a beam of light from said light source therethrough.

* * * * *

UNITED STATES PATENT AND TRADEMARK OFFICE
CERTIFICATE OF CORRECTION

PATENT NO. : 5,298,966
DATED : March 29, 1994
INVENTOR(S) : Michael Berman

It is certified that error appears in the above-indentified patent and that said Letters Patent is hereby corrected as shown below:

```
Column 1, Line 52:  Insert a period after "tests".
Column 2, Line 12:  Insert a period after "line".
Column 2, Line 13:  Insert a period after "track".
Column 3, Line 21:  Delete the comma after "of".
Column 3, Line 23:  Delete "Permitting"; insert --permitting--
Column 3, Line 25:  Insert a period after "gravity".
Column 3, Line 29:  Delete the comma after "Means".
Column 3, Line 47:  After "thereof", insert --to evenly
                    distribute the liquid across the surface
                    of the wafer along a notional plane
                    substantially perpendicular to the pull of
                    gravity.--
Column 4, Line 33:  Delete "elements"; insert --Elements--
COlumn 5, Line 13:  Delete "FIG. a"; insert --FIG. 1--
Column 5, Line 16:  Insert a period after "freely".
Column 5, Line 29:  Insert a period after "invention".
Column 5, Line 63:  Delete "baring"; insert --bearing--
Column 6, Line 36:  After "disposed", insert --away--
```

Signed and Sealed this

Twenty-fifth Day of October, 1994

Attest:

BRUCE LEHMAN

*Attesting Officer*  *Commissioner of Patents and Trademarks*